(12) United States Patent
Hawwa et al.

(10) Patent No.: US 9,188,502 B2
(45) Date of Patent: Nov. 17, 2015

(54) PIPELINE LEAK DETECTOR

(75) Inventors: Muhammad A. Hawwa, Dhahran (SA); Hussain M. Al-Qahtani, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 708 days.

(21) Appl. No.: 13/556,125

(22) Filed: Jul. 23, 2012

(65) Prior Publication Data
US 2014/0020450 A1 Jan. 23, 2014

(51) Int. Cl.
*G01M 3/28* (2006.01)

(52) U.S. Cl.
CPC .................................. *G01M 3/2823* (2013.01)

(58) Field of Classification Search
CPC . F16L 55/1645; F16L 55/265; F16L 2101/30; F16L 55/1283; F16L 55/163; F16L 55/28; F16L 55/26; F16L 2101/16; F16L 2101/60; F16L 55/1141; F16L 55/30; F16L 55/32; F16L 55/34; F16L 55/36; F16L 55/38; F16L 55/40; F16L 55/00; F16L 55/18; F16L 55/46; G01M 3/005; G01M 3/2823; B08B 9/043; B08B 9/04; B08B 9/053; G01N 21/954; Y10S 118/10; Y10S 901/01; Y10S 901/44; Y10S 901/00; Y10S 901/46
See application file for complete search history.

(56) References Cited

U.S. PATENT DOCUMENTS

| | | | |
|---|---|---|---|
| 4,572,003 A | 2/1986 | Fritz | |
| 5,602,327 A | 2/1997 | Torizuka et al. | |
| 6,672,139 B2 | 1/2004 | Pampinella | |
| 6,725,705 B1 | 4/2004 | Huebler et al. | |
| 6,912,890 B2 | 7/2005 | Brewer | |
| 7,178,385 B2 | 2/2007 | McCoy et al. | |
| 7,266,992 B2 | 9/2007 | Shamout et al. | |
| 7,281,411 B2 | 10/2007 | Brewer | |
| 8,869,599 B2* | 10/2014 | Ben-Mansour | G01M 3/005 73/49.5 |
| 2007/0199383 A1* | 8/2007 | Lander | F16L 55/32 73/661 |
| 2009/0126464 A1 | 5/2009 | Perlov et al. | |
| 2011/0283821 A1 | 11/2011 | Ober et al. | |
| 2013/0186181 A1* | 7/2013 | Ben-Mansour | G01M 3/005 73/49.1 |
| 2014/0015521 A1* | 1/2014 | Laursen | G01N 27/82 324/220 |
| 2015/0157877 A1* | 6/2015 | Boyden | A61B 5/0071 607/92 |

OTHER PUBLICATIONS

Website, www.ngoilgas.com/article/Introducing-the-SmartBall-Pipeline-Leak-Detection-System/, four pages printed from the Internet on Apr. 27, 2012.

* cited by examiner

*Primary Examiner* — Daniel S Larkin
*Assistant Examiner* — Jamar Ray
(74) *Attorney, Agent, or Firm* — Richard C. Litman

(57) ABSTRACT

The pipeline leak detector travels through a pipeline passively due to the flow of liquid through the pipeline. The device includes leading and trailing rings shaped to produce hydrodynamic resistance in order for the device to be carried through the pipeline. Wheels are provided about each ring, with at least one wheel having an odometer to measure distance traveled through the pipe. The rings are joined by a plurality of axially oriented connecting rods. A plurality of sensing elements extend between the rings. Each sensing element has a thin laminate of a piezoelectric film sandwiched between two electrically conductive layers, with an electrically insulating coating on the outside of each conductive layer. One of the rings includes microelectronic circuitry for data acquisition and storage.

6 Claims, 3 Drawing Sheets

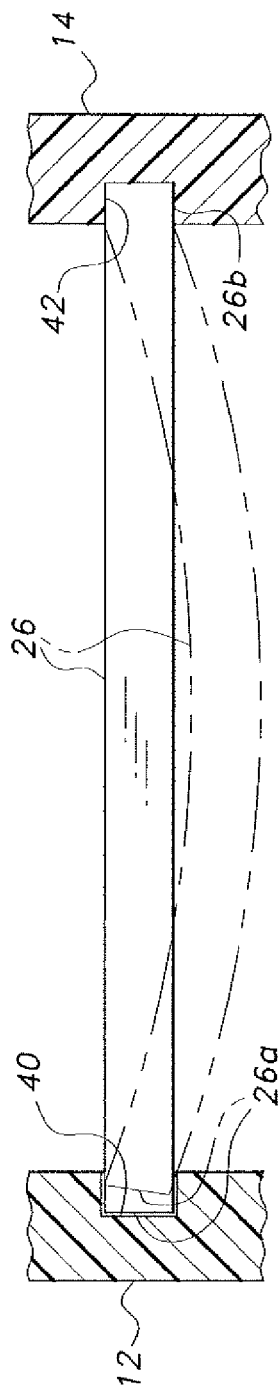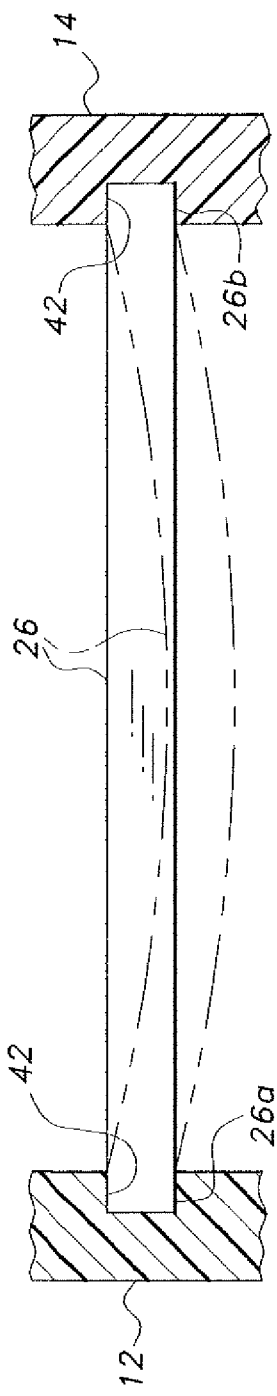

PIPELINE LEAK DETECTOR

BACKGROUND OF THE INVENTION

1. Field of the Invention

The present invention relates to devices and systems for detecting fluid leaks, and particularly to a pipeline leak detector that travels through a pipeline to detect leaks in the walls and/or joints of the pipeline.

2. Description of the Related Art

Pipelines for the conveyance of various liquids are often the most convenient means for transporting such liquids from one point to another. Obviously, there is some economic benefit or advantage in moving the liquids from one place to another, or there would be no point in spending the money to construct the pipeline in the first place. While many persons think of the conveyance of liquids, such as oil, as providing the greatest economic benefit, even less costly liquids, such as water, can provide significant economic benefit when they are transported from locations where they are readily available to locations where they are needed, e.g., major urban areas, agricultural areas, etc.

Due to the financial value of such liquids, it is important to reduce the loss of these liquids to the greatest practical extent. Moreover, many liquids, such as petroleum products, are harmful when released into the general environment. While water is not inherently toxic, it can also do great damage if a sufficient quantity is released into an area where it is not desired, e.g., flooding, soil erosion, softening of underlying soil and weakening of structural foundations, etc. Even relatively small water leaks can result in damage over a prolonged period of time, and the economic loss resulting from the water loss can also be significant over a lengthy period of time, even when no environmental damage occurs.

A number of different robotic devices have been developed in the past for insertion into pipelines, with the devices traveling through the pipe and reporting or registering the locations of the internal condition of the pipe and/or any apparent leakage. These devices are generally known as "pigs," due to the generally elliptical spheroid shape of many such devices. Numerous principles are used by such devices for the detection of internal damage to pipes, including acoustic sensing. However, acoustic sensing is not suitable for use with all pipe materials. Many pipe materials, such as polyvinyl chloride (PVC) and other plastics, rapidly attenuate acoustic transmissions to the point that it is difficult to detect anomalous echoes that may indicate damage to the pipe. Moreover, many of the robotic devices are self-propelled, with the propulsion systems producing a certain amount of acoustic "noise" that can be difficult to filter out when the device is attempting to detect returns from its acoustic detection system.

Thus, a pipeline leak detector solving the aforementioned problems is desired.

SUMMARY OF THE INVENTION

The pipeline leak detector comprises a traveling probe that passes through the pipeline to detect liquid leakage through the wall or joint of the pipe. The device moves passively, i.e., it does not include any powered motive means, but relies upon the force of the liquid moving through the pipe for motion of the probe. The probe is configured to produce hydrodynamic resistance, thus causing the probe to be carried through the pipe by the movement of the liquid in the pipe. Wheels are provided about its circumference at each end to facilitate movement through the pipe. At least one of the wheels preferably includes an odometer for registering the distance traveled through the pipe.

The probe body includes a forward ring and a rearward ring (as considered in the direction of travel through the pipe) connected by axially oriented connecting rods rigidly connecting the two rings to one another. A plurality of sensing elements extend between the two rings. The sensing elements including a core of piezoelectric film, e.g., polyvinylidene difluoride (PDVF). Pressure differentials between the piezoelectric film core(s) of the sensing element(s) and the wall and the center of the pipe result in deflections of these sensing elements, with the deflections producing some variation in electrical output. The variation in the electrical output of the piezoelectric elements is registered as a pressure drop, thus indicating a leak at the location of the element deflection and electrical output variation. Either or both ends of each of the sensing elements may be loosely seated in sockets in either the forward or rearward ring to maximize the bending reaction, or both ends may be immovably affixed in the two rings. The algorithm for determining the leakage is adjusted in accordance with the flexibility and bending of the sensing elements and their installations in the rings. One of the rings, e.g., the trailing ring, includes microelectronic circuitry for data acquisition and storage, e.g., estimates of the magnitude of any leakage encountered, the location of the leakage based upon the odometer travel, etc.

These and other features of the present invention will become readily apparent upon further review of the following specification and drawings.

BRIEF DESCRIPTION OF THE DRAWINGS

FIG. 3A is a partial side view in section of a first embodiment of a pipeline leak detector according to the present invention, wherein the sensing element has one end simply supported by a socket in one of the rings.

FIG. 3B is a partial side view in section of a second embodiment of a pipeline leak detector according to the present invention, wherein the sensing element has both ends rigidly supported by the leading and trailing rings.

Similar reference characters denote corresponding features consistently throughout the attached drawings.

DETAILED DESCRIPTION OF THE PREFERRED EMBODIMENTS

The pipeline leak detector is a passively mobile probe or device that travels through a liquid pipeline for detecting defects in the wall or joints of the pipeline. The device operates by means of a piezoelectric principle, wherein deflection of one or more piezoelectric elements due to a pressure differential in the pipe caused by leakage results in the generation of an electrical signal that is recorded and developed as the indication of a leak at the location of the pressure differential.

Figure 1:
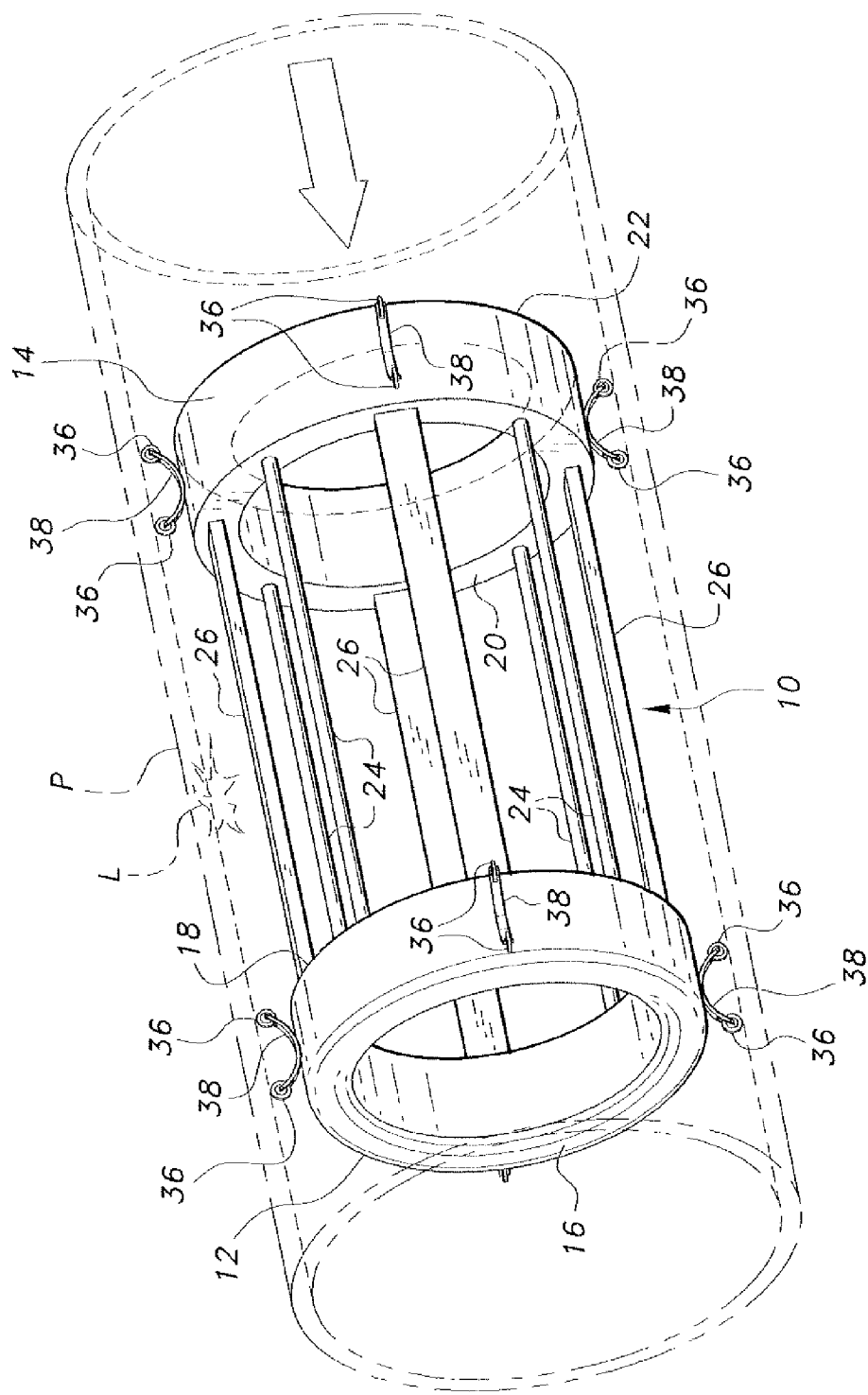
FIG. 1 is a perspective view of a pipeline leak detector according to the present invention, shown within a pipeline, the pipeline being in broken lines.

FIG. 1 provides an environmental perspective view of the pipeline leak detector 10 disposed within a pipeline P, the pipeline P being shown in broken lines. The pipeline leak detector 10 is a traveling probe having a leading or forward ring 12 and a trailing or rearward ring 14. The two toroidal rings have diameters slightly less than the inside diameter of the pipe P. The two rings 12 and 14 are designated as "leading" and "trailing," because the first ring 12 will be at the forward end of the leak detector 10 as it travels through the pipe P while the second ring 14 will be at the rearward end of the detector 10 during such travel. It will be noted that the forward edge or end 16 of the leading ring 12 has a hydrodynamically streamlined shape, and the rearward edge or end 18 also has a similar rounded shape. The forward edge or end 20 of the trailing ring 14 also has a flattened, hydrodynamically resistant shape and the rearward edge or end 22 of the trailing ring 14 has a concave cusp (shown clearly in FIG. 2). These shapes create net hydrodynamic resistance from the trailing ring 14 toward the leading ring 12 as the leak detector 10 travels through the pipe P. Thus, no motive power needs to be provided to cause the leak detector 10 to travel through the pipe P. Net hydrodynamic resistance produces the required passive motive power to push the detector 10 through the pipeline P.

The rings 12 and 14 are spaced apart from one another by a plurality of axially extending rigid connectors 24 that are rigidly connected to each of the rings 12 and 14 to provide a rigid structure for the pipeline leak detector 10. A plurality of axially disposed flexible sensing elements 26 also extend between the two rings 12 and 14. Each of the sensing elements 26 is preferably positioned between two of the connectors 24. The toroidal configuration of the leading and trailing rings 12 and 14 results in the sensing elements 26 extending between the peripheries of the rings 12, 14. The sensing elements 26 are therefore positioned near the wall of the pipeline P as the leak detector 10 travels through the pipe. This positions the sensing elements 26 close to any pressure changes resulting from a leak in the pipe, e.g., the leak L shown in broken lines in FIG. 1 of the drawings, thereby facilitating the detection of any pressure drops due to the leak.

Figure 2:
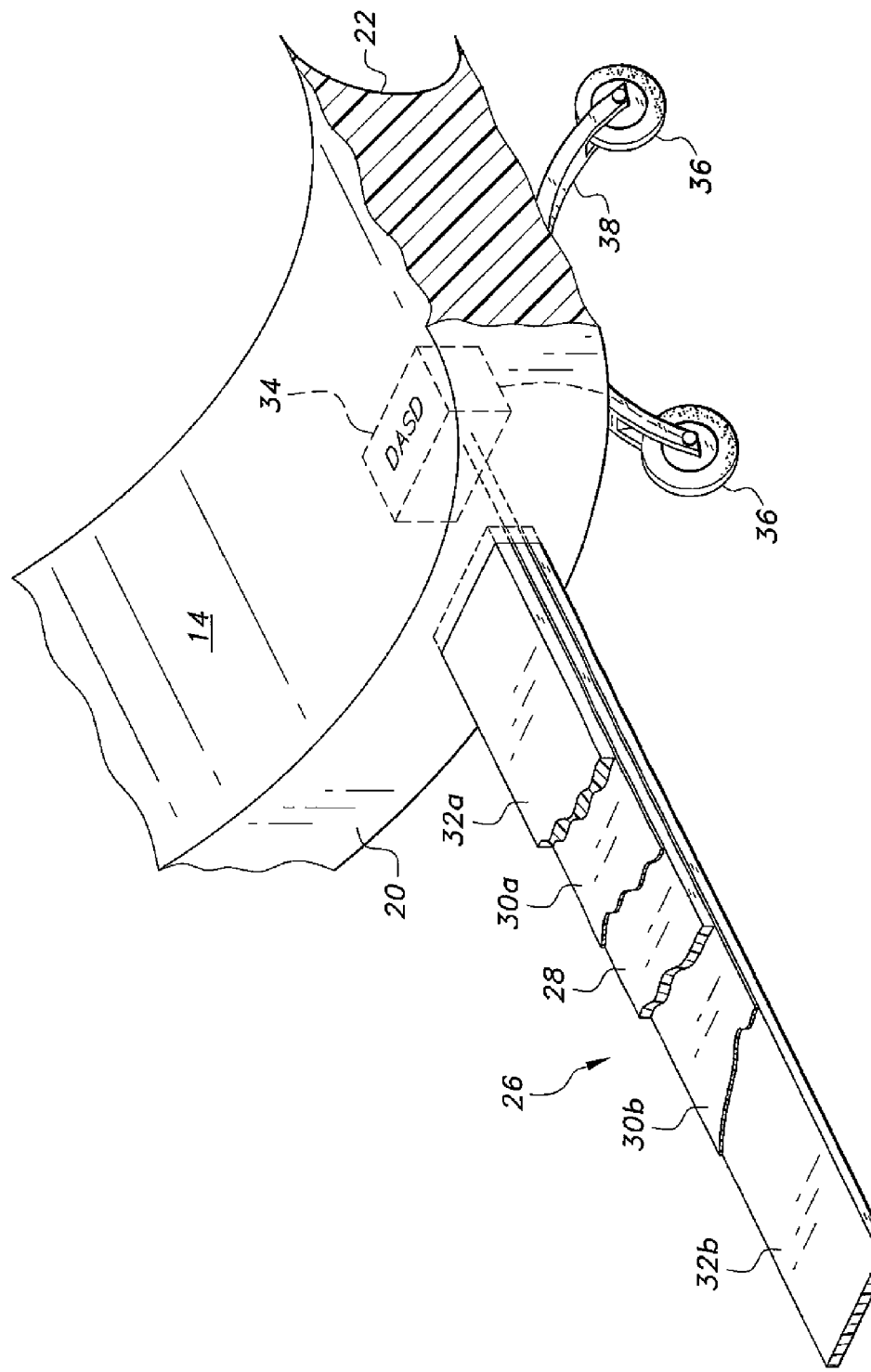
FIG. 2 is a partial perspective view of the pipeline leak detector of FIG. 1, showing one of the sensing elements and one of the rings broken away and partially in section to show details thereof.

FIG. 2 provides a detailed perspective view showing the various plies of one of the sensing elements 26, which is progressively broken away to show the structure of the sensing element 26. Each of the sensing elements 26 includes a thin, flat piezoelectric film core sheet 28 sandwiched between thin, flat first and second electrically conductive plies 30a and 30b (e.g., layers of silver). The piezoelectric film core sheet 28 may be formed of a number of piezoelectric materials, such as polyvinylidene difluoride (PVDF). Such materials produce an electric current when deflected or deformed, the current flowing to either or both of the two conductive sheets or plies 30a and 30b to either side of the piezoelectric core 28 when it is deflected. Thin, flat first and second electrically insulating sheets 32a and 32b (a protective polymeric coating) are applied over the first and second electrically conductive sheets or plies 30a and 30b, thereby capturing the electrically conductive plies 30a, 30b between the corresponding electrically insulating sheets 32a, 32b and the central piezoelectric core 28.

The piezoelectric sensing elements 26 transmit the electrical current generated by their deflection to an onboard data acquisition and storage device (DASD) 34, shown in broken lines within the trailing ring 14 in FIG. 2. The onboard data acquisition and storage device 34 may alternatively be installed in the leading ring 12. The data gathered by the device 34 may be processed in real time, or stored for downloading when the leak detector 10 is recovered from the pipe after its journey therethrough. The sensing elements 26 preferably are elongated flat rectangular elements, so that the amount of deflection may be computed similar to the deflection or bending of a flat beam, which may be simply supported at one end, or which may be rigidly fixed at both ends. The total electrical charge $Q_{Tot}$ resulting from deflection of one of the piezoelectric sensing elements 26 is determined according to the formula:

$$Q_{Tot} = \epsilon_3 \cdot h_{31} \cdot w \cdot \int_0^L x(l)dl$$

where $\epsilon_3$ is the dielectric permeability, $h_{31}$ is the piezoelectric coefficient, w is the width of the beam, and x(l) is the bending amount at location l. Thus, the greater the leak, the greater the pressure differential between the liquid in the core of the pipe P (and the detector 10) and the outer wall of the pipe P adjacent the sensing element(s) 26, and the greater the deflection and corresponding electrical current generated by the sensing element(s) 26.

The above-described formula enables the pipeline leak detector 10 to determine the magnitude of any given leak discovered as it travels through the pipe P. However, some means must be provided to determine the location of the leak as well. Accordingly, an odometer system is provided to enable the leak detector 10 to determine the location of any leaks discovered along its travel through the pipe P. The detector 10 preferably includes a plurality of wheels 36 that extend from radially disposed arms 38 that extend from the outer peripheries of the two rings 12 and 14 (e.g., every 90°). The wheels 36 roll along the inner wall of the pipe P as the detector 10 travels through the pipe. A detail of this assembly is shown in FIG. 2 of the drawings. A conventional odometer sender, e.g., electrical generator, mechanical cable, etc., is disposed in the hub of one of the wheels, and transmits a signal corresponding to the number of rotations of the wheel to the data acquisition and storage unit 34. The number of rotations of the wheel is easily converted to distance traveled, and matched with any variations in electrical current received corresponding to a deflection(s) of one or more of the sensing elements 26 that would indicate a leak in the pipe P.

It will be seen that various factors may affect the deflection of the leak sensing elements 26, e.g., the viscosity of the liquid within the pipe P (water, oil, etc.) and the attachment of the sensing elements 26 to the two rings 12 and 14, among others. The viscosity of the liquid may be accounted for by a constant in the equation, and the mounting or attachment of the sensing elements 26 may be fabricated as desired for optimum effect. FIG. 3A provides a side elevation view in partial section of a preferred means of mounting the sensing elements between the rings 12, 14, in which the leading end 26a of the sensing element 26 is loosely attached or suspended in a socket or slide receptacle 40 in the leading ring 12, and the opposite trailing end 26b of the sensing element is immovably affixed in a gripping socket 42 in the trailing ring 14. This arrangement permits the sensing element 26 to bend or deflect more freely than if both of its ends were immovably affixed within gripping sockets 42 in both rings 12 and 14, as shown in FIG. 3B of the drawings.

As the length of the sensing element 26 is constant, the slide fit of the leading end 26a of the element 26 in the receptacle 40 of the leading ring 12 allows that end of the sensing element 26 to pull slightly from the receptacle 40 as the element 26 is bent, generally as shown in broken lines in FIG. 3A. Conversely, the immovably affixed ends 26a, 26b of the sensing element 26 in the gripping sockets 42 in the two rings 12 and 14 of FIG. 3B preclude either of the ends from pulling slightly from their attachments in the rings 12 and 14. This results in a smaller deflection for the sensing element 26 when secured in the manner illustrated in FIG. 3B. Accordingly, the embodiment illustrated in FIG. 3A, wherein one of the ends 26a of the sensing element 26 floats movably within a receptacle 40 in one of the rings 12, is preferred. This allows any given pressure differential (leak) to produce a greater deflection, and thus greater piezoelectric current generation in the sensing element 26. While only a single freely floating end 26a is shown in FIG. 3A for the sensing element 26, it will be seen that both ends may be loosely secured within the respective rings 12 and 14, if desired, although the freedom of movement will be essentially the same whether one or both ends are free to move slightly within the rings.

Accordingly, the pipeline leak detector provides an extremely accurate means of locating even very small leaks in liquid pipelines. The device is economical to operate in that it requires no power for transport through the pipeline, but relies upon the motion of the liquid in the pipeline for its motion. The only onboard power requirement is the small amount needed to operate the onboard data acquisition and storage device located in one of the two rings defining the leading and trailing ends of the device. The data gathered by the onboard device may be downloaded when the device is recovered and correlated with the odometer readings to determine the location of any leakage within the pipe. This greatly facilitates the process of finding any such leakage, and eliminates the need for physical human inspection of the pipe along its route.

It is to be understood that the present invention is not limited to the embodiments described above, but encompasses any and all embodiments within the scope of the following claims.

We claim:

1. A pipeline leak detector, comprising:
   a toroidal leading ring;
   a toroidal trailing ring, the trailing ring being rigidly connected to the leading ring;
   a plurality of flexible sensing elements axially extending between the leading ring and the trailing ring, each of the detector elements having:
   a thin, flat piezoelectric film core sheet;
   thin, flat first and second electrically conductive layers sandwiching the core sheet therebetween; and
   thin, flat first and second electrically insulating sheets disposed respectively about the first and second electrically conductive layers, each of the conductive layers being captured between a corresponding one of the insulating sheets and the core sheet.

2. The pipeline leak detector according to claim 1 further comprising a plurality of rigid connectors axially extending between the leading ring and the trailing ring, the connectors connecting the leading ring and the trailing ring to one another.

3. The pipeline leak detector according to claim 1, wherein:
   the leading ring has a hydrodynamically streamlined leading edge; and
   the trailing ring has a concave, hydrodynamically resistant trailing edge.

4. The pipeline leak detector according to claim 1, further comprising:
   a plurality of wheels extending radially from the leading ring and the trailing ring;
   an odometer disposed in one of the wheels; and
   an onboard data storage device disposed in one of the rings, the odometer communicating with the onboard data storage device.

5. The pipeline leak detector according to claim 1 wherein each of the sensing elements has a leading end and a trailing end opposite the leading end, at least one of the ends of each of the sensing elements being movably supported within the corresponding leading ring and trailing ring.

6. The pipeline leak detector according to claim 1 wherein each of the sensing elements has a leading end and a trailing end opposite the leading end, each of the ends of each of the sensing elements being immovably affixed within the corresponding leading ring and trailing ring.

* * * * *